(12) United States Patent
de Chabris

(10) Patent No.: US 9,482,109 B2
(45) Date of Patent: Nov. 1, 2016

(54) COMPRESSED GAS ENERGY STORAGE AND RELEASE SYSTEM

(76) Inventor: Andrew Marks de Chabris, Toronto (CA)

( * ) Notice: Subject to any disclaimer, the term of this patent is extended or adjusted under 35 U.S.C. 154(b) by 146 days.

(21) Appl. No.: 14/124,488

(22) PCT Filed: Jun. 6, 2012

(86) PCT No.: PCT/CA2012/000557
§ 371 (c)(1),
(2), (4) Date: Jun. 9, 2014

(87) PCT Pub. No.: WO2012/174642
PCT Pub. Date: Dec. 27, 2012

(65) Prior Publication Data
US 2014/0338315 A1 Nov. 20, 2014

(30) Foreign Application Priority Data

Jun. 7, 2011 (CA) ..................................... 2742424

(51) Int. Cl.
| | | |
|---|---|---|
| F02C 6/16 | (2006.01) | |
| F02C 1/05 | (2006.01) | |
| F01D 15/10 | (2006.01) | |
| F03G 7/04 | (2006.01) | |
| H02J 15/00 | (2006.01) | |

(52) U.S. Cl.
CPC ............... *F01D 15/10* (2013.01); *F02C 1/05* (2013.01); *F02C 6/16* (2013.01); *F03G 7/04* (2013.01); *H02J 15/006* (2013.01); *F05D 2260/20* (2013.01); *F05D 2260/208* (2013.01); *F05D 2260/42* (2013.01); *Y02E 60/15* (2013.01)

(58) Field of Classification Search
CPC .............. F02C 1/05; F02C 6/16; F03G 7/04; F01D 15/10; F05D 2260/20; F05D 2260/208; F05D 2260/42; H02J 15/006; Y02E 60/15
See application file for complete search history.

(56) References Cited

U.S. PATENT DOCUMENTS

| | | | | |
|---|---|---|---|---|
| 3,677,008 | A * | 7/1972 | Koutz | ............................. 60/650 |
| 3,875,749 | A * | 4/1975 | Baciu | ....................... F01K 7/32 |
| | | | | 165/45 |
| 4,124,805 | A | 11/1978 | Jacoby | |
| 4,150,547 | A | 4/1979 | Hobson | |
| 4,281,256 | A | 7/1981 | Aherns et al. | |
| 4,765,142 | A | 8/1988 | Nakhamkin | |
| 4,872,307 | A | 10/1989 | Nakhamkin | |
| 4,885,912 | A | 12/1989 | Nakhamkin | |
| 4,936,098 | A | 6/1990 | Nakhamkin | |

(Continued)

OTHER PUBLICATIONS

International Search Report for PCT/CA2012/000557, mailed Sep. 14, 2012.

*Primary Examiner* — Audrey K Bradley
(74) *Attorney, Agent, or Firm* — Hoffmann & Baron, LLP

(57) ABSTRACT

A compressed gas energy storage and release (CGESR) system and method. The system has a gas compressor, a container for storing compressed gas, a pressure engine, and an underground high temperature region. Conduits connect the gas compressor, the container and the pressure engine. The compressed gas drives the pressure engine. An electrical power generating means is operatively connected to said pressure engine to generate electricity. The system further comprises a means to heat at least a portion of one of the conduits utilizing heat from the underground high temperature region to heat the compressed gas therein prior to driving the pressure engine.

20 Claims, 10 Drawing Sheets

(56) References Cited

U.S. PATENT DOCUMENTS

| | | |
|---|---|---|
| 5,671,608 A | 9/1997 | Wiggs et al. |
| 7,086,231 B2 | 8/2006 | Pinkerton |
| 7,178,337 B2 | 2/2007 | Pflanz |
| 2007/0006586 A1 | 1/2007 | Hoffman et al. |
| 2008/0131830 A1* | 6/2008 | Nix .......................... F24D 5/00 432/220 |
| 2011/0016864 A1 | 1/2011 | Wright et al. |
| 2011/0094229 A1* | 4/2011 | Freund ..................... F02C 6/14 60/727 |
| 2011/0100010 A1* | 5/2011 | Freund et al. ................. 60/659 |
| 2011/0127004 A1* | 6/2011 | Freund et al. ................. 165/45 |

* cited by examiner

COMPRESSED GAS ENERGY STORAGE AND RELEASE SYSTEM

FIELD OF THE INVENTION

The present invention relates generally to compressed gas energy storage and release (CGESR) systems. More particularly, the present invention relates to a system which provides increased efficiency and reduced system cost compared to known CGESR systems.

BACKGROUND OF THE INVENTION

As is known, energy may be stored in the form of compressed air in underground reservoirs comprising caverns or wells. Air compressors are used to fill such an underground reservoir, ideally during off peak times when the price of electricity is at its lowest (i.e. at night). The compressed air is then converted back into electricity and used during peak times when the price of electricity is at its highest. The conversion back to electricity is with a pressure engine such as turbine or piston engine in a known fashion.

One problem with the above compressed air energy storage and release systems is that as the compressed air is expanded in the pressure engine it cools rapidly on expansion. Rapid cooling of the machinery results in 1) enbrittlement of metal, rubber or plastic components, and 2) degradation of lubricants leading, both leading to excess wear, increased maintenance costs, and unexpected failure. To prevent the pressure engines from rapid cooling the air is expanded and heated before it reaches the pressure engines. The requirement for heating greatly reduces the efficiency of the compressed air storage cycle.

There have been various attempts to improve the efficiency of CAESR systems. For example, U.S. Pat. No. 4,281,256 to Ahrens for a "compressed air energy storage system" discloses a compressed air energy storage system in which an internal combustion reciprocating engine is operable as a compressor during slack demand periods utilizing excess power from a power grid to charge air into an air storage reservoir and as an expander during peak demand periods to feed power into the power grid. As an expander, the internal combustion engine utilizes a mixture of air obtained from the air storage reservoir and combustible fuel, which mixture is burned and expanded in the engine. One problem with this approach is that it requires spending a combustible fuel, and entails generation of pollution which is harmful to the environment.

As another example, U.S. Pat. No. 7,086,231 issued to Pinkerton entitled "Thermal and Compressed Air Storage System", discloses a system which utilizes an exhaustless heater, such as a thermal storage unit, to heat compressed air prior to it entering a turbine, which powers an electrical generator. The exhaustless heater is described as being any type of heater which does not produce a waste product (e.g., a noxious or toxic emission). However, the Pinkerton system suffers from the same inefficiencies as the Jacoby system in that it requires spending energy to heat the cold compressed air. Depending on what energy source is used to power the heater, the Pinkerton system may also generate of pollution which is harmful to the environment, even if it is not noxious or toxic.

Another attempt to increase efficiency of CAESR systems is disclosed in U.S. Pat. No. 4,124,805 to Jacoby entitled "Pollution-Free Power Generating and Peak Power Load Shaving System". Jacoby discloses a method and means whereby during periods of low load demands upon a conventional type electric power generating plant, the excess power then available is employed (at low cost to the system) to pump low temperature ambient air at relatively low pressure into a subterranean cavity in a salt deposit which is in thermal communication via an interconnecting spire or dome of salt with a geological "mother bed" occurring at such depths below the earth's surface as to constitute a constant height heat source. The air conduit system is intermittently closed, whereupon the heat intake from the earth's center causes significant storage of heat energy in the entrapped air and substantial increases of the pressure under which it is entrapped. When load requirements upon the generating plant are high, the high pressure/temperature air supply developed within the subterranean cavity is released to operate any suitably responsive turbine so as to contribute to supply of the higher power demand. A problem with Jacoby is that it requires locating a subterranean salt dome and building a generating plant located in proximity thereto. Furthermore, Jacoby requires establishing the cavity by solution mining techniques in a salt deposit which is in thermal communication via an interconnecting spire or dome of salt with a geological "mother bed" occurring at such depths below the earth's surface as to constitute a constant high heat source, which is a difficult, and expensive procedure.

U.S. Pat. App. Pub. No. 2007/0006586 published in the name of Hoffman entitled "Serving End Use Customers with Onsite Compressed Air Energy Storage Systems", discloses a system for storing compressed air without the use of combustion in an underground void (such as a cave or mine), a below ground tank, or an above ground tank. Hoffman suggests increasing the output of the system by using solar power to heat the cold air that would enter the expander. Other sources of additional heating of the air are mentioned as well, including waste heat, geothermal and any other source heat available on the site. Although considered environmentally friendly, using solar power to power the cold air heaters is problematic in that the equipment necessary is expensive to acquire and install, and requires constant maintenance. The batteries required by the solar power system are not environmentally friendly and need to be replaced at regular intervals measured in years. Furthermore, some locations do not reliably receive sufficient sunlight to permit solar power as the sole source of power, and in most cases backup power will need to be built into the system, resulting in additional costs and inefficiencies. Using source heat that is available on the site is also problematic in that it severely limits possible locations where the system may be built.

Attempts by others are described in the following U.S. patents, each exhibiting their own problems: U.S. Pat. No. 4,150,547 (Hobson), U.S. Pat. No. 4,765,142 (Nakhamkin), U.S. Pat. No. 4,872,307 (Nakhamkin), U.S. Pat. No. 4,885,912 (Nakhamkin), U.S. Pat. No. 4,936,098 (Nakhamkin), U.S. Pat. No. 5,671,608 (Wiggs), U.S. Pat. No. 7,178,337 (Pflanz).

In view of the above, there is a continuing need for improvements in CAESR systems. What is desired therefore, are systems and methods which overcome at least some of the problems associated with prior art CAESR systems.

SUMMARY OF THE INVENTION

Preferably, embodiments of the present invention will address the problem of gas from the compressed gas reservoir freezing a power generating turbine using a geothermal heat source to heat the expanded gas prior to the expanded gas entering the turbine under pressure. More preferably, the geothermal heat source will be accessible across a broader geographic area and a more flexible application than the geothermal heat sources currently being used with prior art systems and methods.

Accordingly, an embodiment of the present invention utilizes a conduit which extends from a compressed gas reservoir and travels downwards below the earth's surface to an underground geothermal formation having a region with a high temperature and then back up to a pressure engine such as turbine or piston engine located on the earths surface. The compressed gas from the compressed gas reservoir is heated in the conduit as it passes through the high temperature region underground. The conduit is configured and arranged so that the compressed gas is heated in the conduit to a temperature which results in the expanded gas being above freezing prior to entering the pressure engine.

Other embodiments of the present invention include a valve which regulates the amount of heated and/or unheated compressed gas entering the pressure engine.

Yet another embodiment of the present invention utilizes a geothermal loop with one end of the loop positioned below the earth's surface in the high temperature region of the underground geothermal formation and the other end of the loop positioned in a heat exchanger above ground. A separate conduit carrying compressed gas to or from the underground compressed gas reservoir is coupled to the heat exchanger to permit heating of the compressed gas to a temperature which results in the expanded gas being above freezing prior to entering the pressure engine.

Therefore, according to one aspect of the present invention there is disclosed a compressed gas energy storage and release (CGESR) system comprising:
- a gas compressor for compressing gas;
- a container configured to store said compressed gas, said container being in communication with said gas compressor via a first conduit;
- a pressure engine in communication with said container via a second conduit, said pressure engine being driven by expansion of said compressed gas, thereby converting said compressed gas into mechanical work;
- an electrical power generating means operatively connected to said pressure engine, said electrical power generating means being configured to convert said mechanical work into electricity;
- an underground high temperature region positioned at a level below a surface of the earth;
- means to heat at least a portion of said first conduit or said second conduit utilizing heat from said underground high temperature region to form a heated compressed gas therein.

According to another aspect of the present invention there is disclosed a method of storing and releasing compressed gas energy, said method comprising the steps of:
- compressing a gas to form a compressed gas;
- heating at least a portion of said compressed gas utilizing heat from an underground high temperature region to form a heated compressed gas, said underground high temperature region being positioned at a level below a surface of the earth;
- storing said compressed gas in a container, before or after said heating step;
- converting at least said heated compressed gas into mechanical work; converting said mechanical work into electricity.

According to another aspect of the present invention there is disclosed a compressed gas energy storage and release (CGESR) system comprising:
- a gas compressor;
- a container for storing compressed gas;
- a pressure engine;
- an electrical power generating means operatively connected to said pressure engine;
- an underground high temperature region; and
- one or more conduits connecting the gas compressor to said container via said underground high temperature region; and
- a conduit connecting said container to said pressure engine.

According to another aspect of the present invention there is disclosed a compressed gas energy storage and release (CGESR) system comprising:
- a gas compressor;
- a container for storing compressed gas;
- a pressure engine;
- an electrical power generating means operatively connected to said pressure engine;
- an underground high temperature region;
- a conduit connecting the gas compressor to said container;
- a conduit connecting said container to a valve;
- one or more conduits connecting said container to said valve via said underground high temperature region; and
- a conduit connecting said valve to said pressure engine.

According to another aspect of the present invention there is disclosed a compressed gas energy storage and release (CGESR) system comprising:
- a gas compressor;
- a valve connected to said gas compressor;
- a container for storing compressed gas;
- a pressure engine;
- an electrical power generating means operatively connected to said pressure engine;
- an underground high temperature region;
- a first conduit connecting the valve to said container;
- at least a second conduit connecting said valve to said container via said underground high temperature region; and
- a conduit connecting said container to said pressure engine.

According to another aspect of the present invention there is disclosed a compressed gas energy storage and release (CGESR) system comprising:
- a gas compressor;
- a container for storing compressed gas;
- a pressure engine;
- an electrical power generating means operatively connected to said pressure engine;
- an underground high temperature region;
- a heat conducting loop having one end positioned in said underground high temperature region
- a conduit connecting said gas compressor to said container; and
- a conduit connecting said container to said pressure engine, a portion of which conduit is conductively connected to another end of said heat conducting loop.

According to another aspect of the present invention there is disclosed a compressed gas energy storage and release (CGESR) system comprising:
- a gas compressor;
- a container for storing compressed gas;
- a pressure engine;

an electrical power generating means operatively connected to said pressure engine;
an underground high temperature region;
a heat conducting loop having one end positioned in said underground high temperature region
a conduit connecting said gas compressor to said container, a portion of which conduit is conductively connected to another end of said heat conducting loop; and
a conduit connecting said container to said pressure engine.

According to another aspect of the present invention there is disclosed a compressed gas energy storage and release (CGESR) system comprising:
a gas compressor;
a container for storing compressed gas;
a pressure engine;
an electrical power generating means operatively connected to said pressure engine;
an underground high temperature region;
said gas compressor being connected to said container to provide compressed gas therein;
said container being connected to said pressure engine to provide said compressed gas to operate said pressure engine;
one or more conduits for passing compressed gas through said high temperature region.

According to another aspect of the present invention there is disclosed a method of storing and releasing compressed gas energy comprising:
compressing gas and storing the gas in a container;
passing the gas from the container to a pressure engine operatively connected to an electrical power generating means;
heating the gas prior to the gas being passed to the pressure engine by passing the gas through an underground high temperature region.

BRIEF DESCRIPTION OF THE DRAWINGS

Reference will now be made to the preferred embodiments of the present invention with reference, by way of example only, to the following drawings in which.

DETAILED DESCRIPTION OF THE PREFERRED EMBODIMENTS

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein. In the figures, like elements are given like reference numbers. For the purposes of clarity, not every component is labelled in every figure, nor is every component of each embodiment of the invention shown where illustration is not necessary to allow those of ordinary skill in the art to understand the invention.

Figure 1:
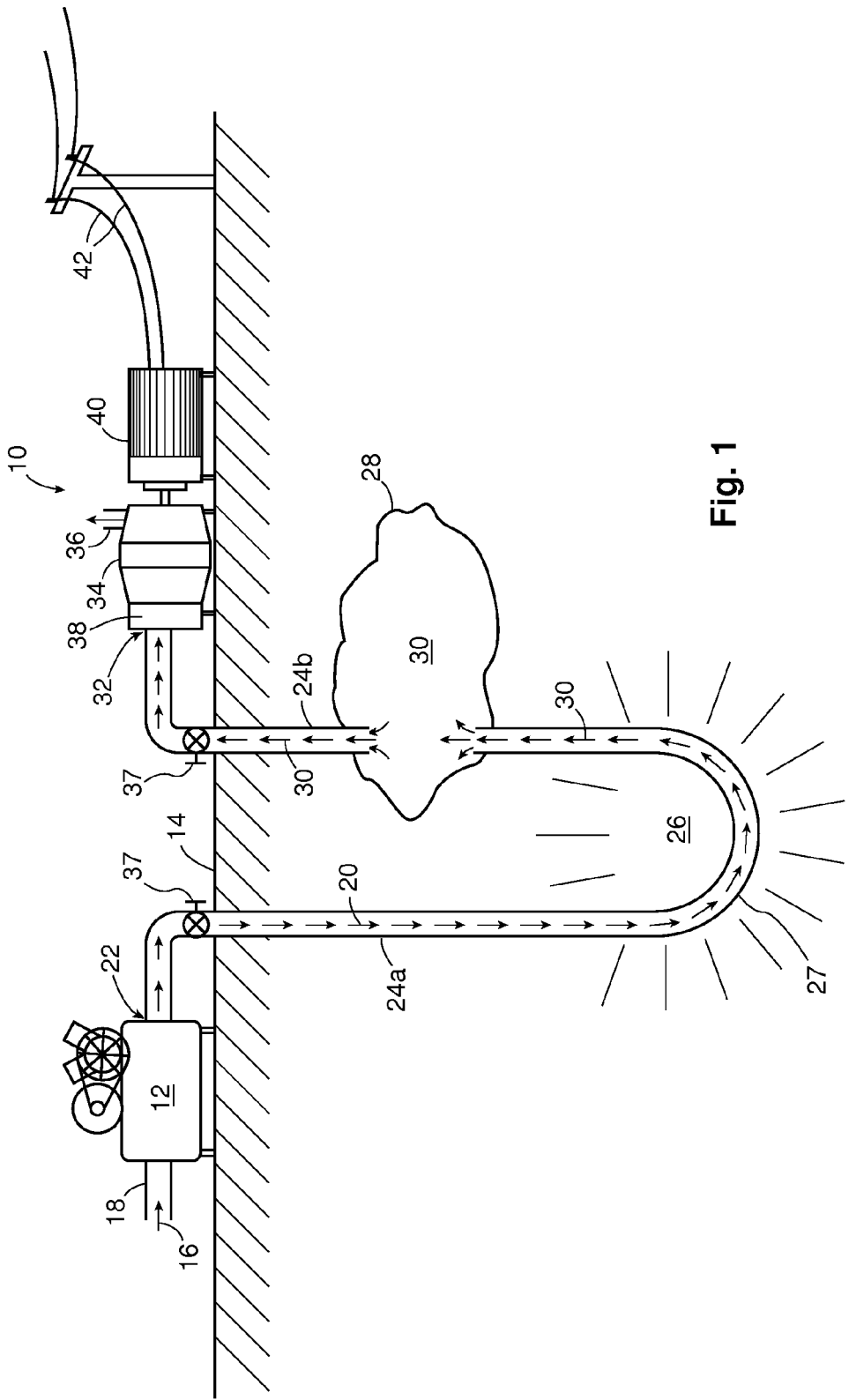
FIG. 1 is a diagram of an embodiment of the CGESR system of the present invention, showing a geologic formation for storing compressed gas positioned on a conduit downstream of a high temperature region.

Referring now to FIG. 1, there is shown generally at 10 a compressed gas energy storage and release (CGESR) system according to an embodiment of the present invention. A gas compressor 12, positioned on the earths surface 14, draws a gas 16, preferably air, through an inlet 18, compresses the gas and expels the compressed gas 20 under pressure through an outlet 22 into a conduit 24a. The conduit 24a travels downward under the earth's surface 14 to an underground geothermal formation having a region of high temperature 26. The conduit 24a passes through the high temperature region 26 and then back up to an underground geologic formation 28, such as a cavern or cavity capable of holding and storing the compressed gas 20. The compressed gas 20 is heated as it passes in the conduit 24a through the high temperature region 26. Thus it will be appreciated that the geologic formation 28 will hold and store heated compressed gas 30. Preferably, the geologic formation 28 will hold and store heated compressed gas compressed by gas compressor 12 at one time, for example an off peak time when the cost of electricity is lower, and release the heated compressed gas to drive the generator 40 at a second time, for example a peak time when the cost of electricity is higher. A conduit 24b connects the geologic formation 28 to an inlet end 32 of a pressure engine 34, such as turbine or piston engine located on the surface 14. The heated compressed gas 30 drives the pressure engine 34 as it passes therethrough to outlet end 36 which exhausts the gas to the atmosphere. Preferably, the heated compressed gas 30 is allowed to expand in an expander 38 associated with the pressure engine 34 prior to entering the pressure engine 34. The pressure engine 34 converts the energy in the compressed gas into mechanical work. The pressure engine 34 is operatively connected to and drives an electrical power generating means such as generator 40 which generates electricity which is then transmitted to a power grid through powerlines 42 in a known fashion. Thus generator 40 converts the mechanical work of the pressure engine 34 into electricity. As can now be appreciated the heating of the compressed gas results in an expanded gas used to drive the pressure engine 34 at a temperature above freezing, and so does not interfere with its operation. The fact that the heating of the compressed gas 20 is accomplished by using geothermal heat means that the system 10 is cost effective. Moreover, the fact that the geothermal heat is tapped using an underground conduit, means that the geothermal heat may be accessed in a broader geographical area than is available to known systems.

Although conduit 24*a* is shown in FIG. 1 as extending vertically down to the high temperature region 26, before turning horizontally and looping back vertically upwards towards the surface 14, it will be appreciated that the conduit 24*a* is prepared using drilling techniques well known in the oil and gas industry. Accordingly, the conduit 24*a* may be formed at other angles than those shown in FIG. 1. The ability and technology to drill downwards underground, as well as along a curved trajectory, will be appreciated by persons skilled in the art. Such drilling techniques enable the underground connection of high temperature regions 26 and geologic formations 28 which are not directly below the above ground facilities, but which may in fact be several kilometers horizontally from the aboveground facilities to which they are ultimately connected. The conduits may be simple boreholes, boreholes lined with cement or metal sleeves, or pipes formed from metal or other suitable materials, or combinations thereof. Depending on various factors, including the porosity of the earth at the site of the facility, it may be necessary to have some or all of the conduits formed, in whole or in part, from sections of pipe. In some cases, it may be sufficient to prepare, for example conduit 24*a*, by first providing a borehole, then lining only a portion thereof with a cement or metal sleeve near the earth's surface 14, and connecting the gas compressor 12 with a pipe. In other cases, it may be possible to omit the cement or metal lining. In other cases still it may be necessary to utilize pipe for the whole of the conduit 24*a*, whether or not a cement or metal lining is also used. What is important is that the conduits will be pressurizable.

Figure 7:
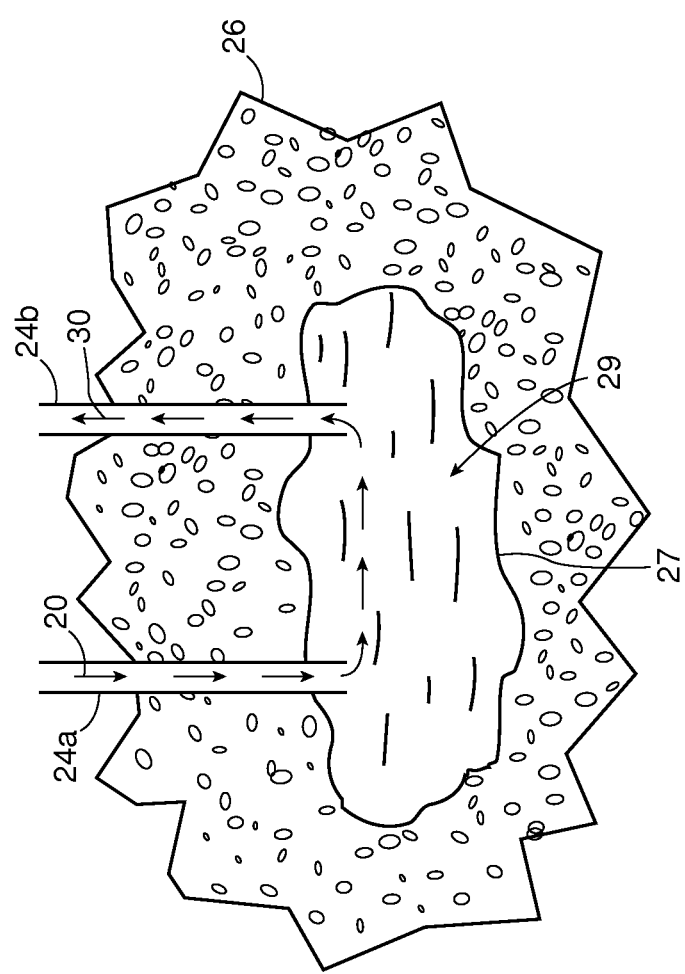
FIG. 7 is a detail showing two conduits connected together via a cavity in the high temperature region according to another embodiment of the present invention.
Figure 8:
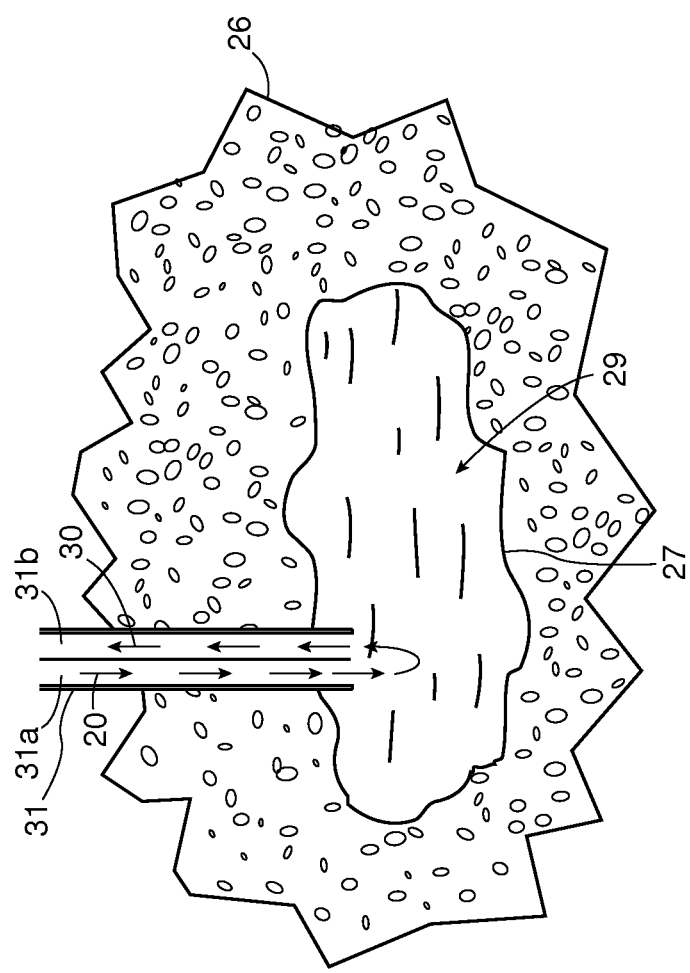
FIG. 8 is a detail similar to FIG. 7, but showing a single conduit having two conduits connected to the cavity in the high temperature region according to another embodiment of the present invention.

Moreover, conduit 24*a*, though shown in FIG. 1 with a looped section 27, may in fact comprise two separate conduits within the high temperature region 26 and separated by a distance (not shown). For example, as shown in FIG. 7, a porous underground field or cavity 29 created by hydraulic fracturing techniques can be used to join conduits 24*a* and 24*b* in the high temperature region 26. Cavity 29 may be preexisting, or formed when the CGESR system 10 is installed. According to another example, as shown in FIG. 8, the looped section 27 may comprise a single pipe 31 defining two conduits 31*a*, 31*b*, one for the downwardly moving compressed gas and one for the upwardly moving compressed gas. What is important, however, is that the compressed gas is forced under pressure downward to the high temperature region 26 and recovered by forcing it back upwards, in this case to underground geologic formation 28.

Carbon dioxide and helium are alternate gases that could be used instead of air. Other gases may also be chosen by the person skilled in the art on the basis of their heat transfer characteristics, and associated costs, including containment and disposal costs. However, it is contemplated that if a gas other than air were used, it would be desirable to incorporate a closed loop into the system 10 by connecting the exhaust of pressure engine 34 outlet 36 to inlet 18 on the gas compressor.

For clarity and ease of understanding of the present invention, some of the various components of the system are discussed herein, and shown in the figures, as being separate elements. However, it will be appreciated that some of these components may in fact be combined into a single apparatus which serves the separate functions described herein. For example, although the gas compressor 12 and the pressure engine 34 are discussed, and shown in the figures, as being separate, it is contemplated that they may in fact be combined into one apparatus. Similarly, the pressure engine 34 and the generator 40 may be combined into one apparatus.

Figure 2:
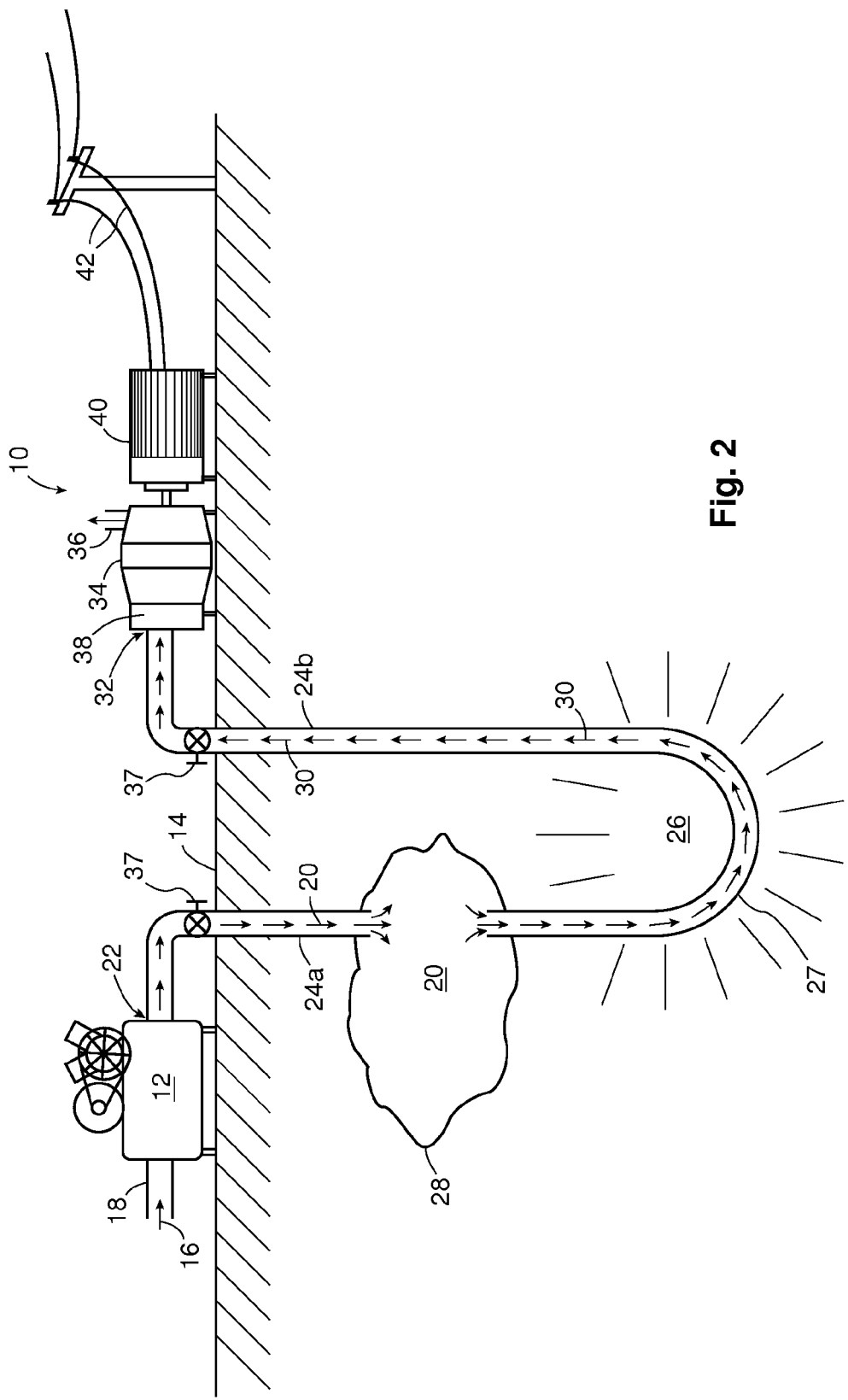
FIG. 2 is a diagram of another embodiment of the CGESR system of the present invention similar to the embodiment in FIG. 1, but which shows the geologic formation positioned on the conduit upstream of the high temperature region.

Shown in FIG. 2 is a compressed gas energy storage and release (CGESR) system according to another embodiment of the present invention, which is similar to the embodiment shown in FIG. 1, except that conduit 24*a* travels downward under the earth's surface 14 to geologic formation 28, before conduit 24*b* travels to the high temperature region 26.

It will be appreciated that in the embodiments shown in FIGS. 1 and 2, the preferred CGESR system 10 will include in the gas compressor 12 and the expander 38 means for inhibiting the release of the compressed gas 20 from the geologic formation when either the gas compressor 12 or the pressure engine 34 are not operating. Alternately, valves 37 may be added to the system 10 to accomplish the same result, for example in conduit 24*a* after gas compressor 12, and in conduit 24*b* before expander 38.

Figure 3:
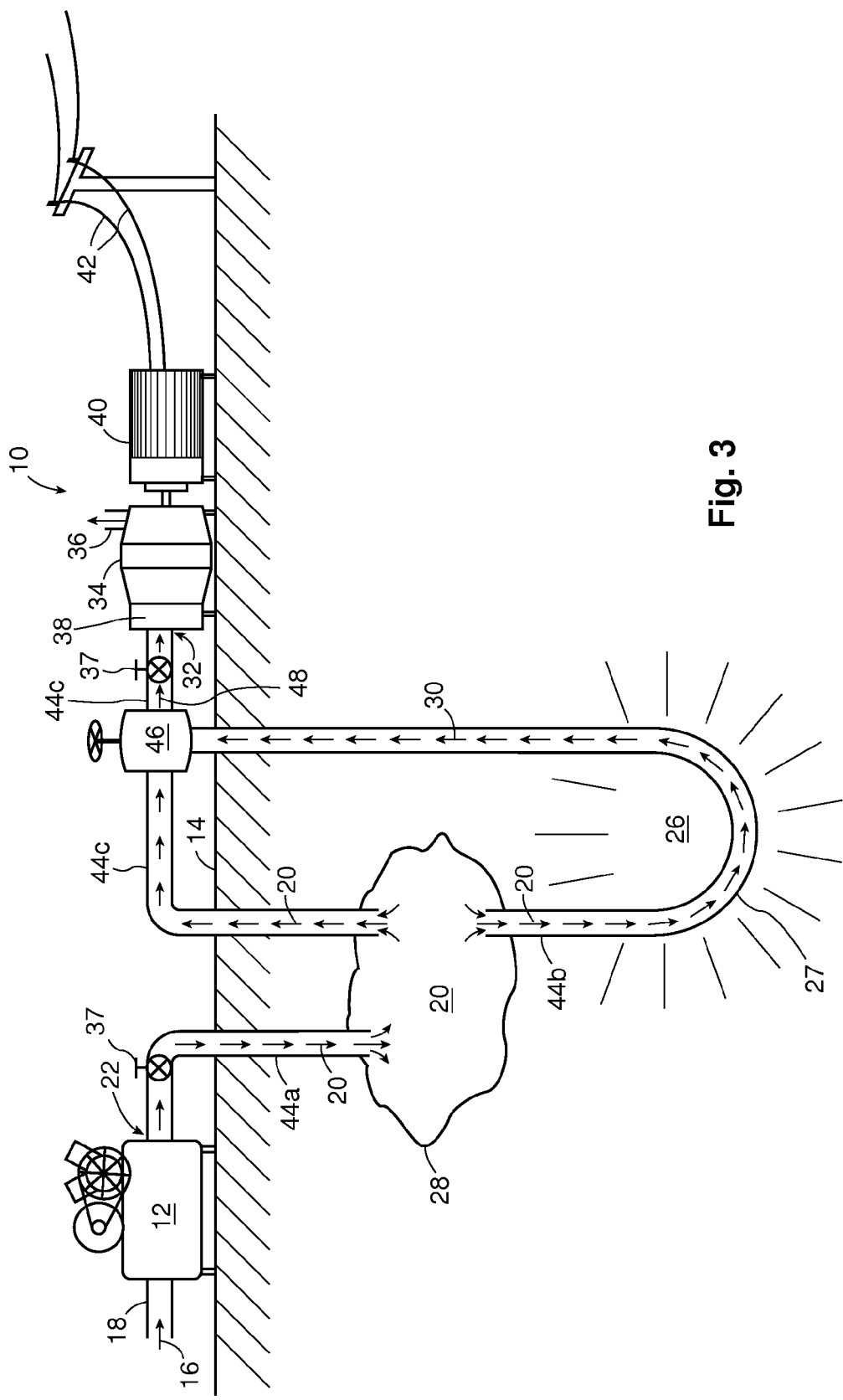
FIG. 3 is a diagram of another embodiment of the CGESR system of the present invention.

Referring now to FIG. 3, there is shown generally at 10 a CGESR system according to another embodiment of the present invention. The gas compressor 12, positioned on the earths surface 14, draws a gas 16, preferably air, through an inlet 18, compresses the gas and expels the compressed gas 20 under pressure through an outlet 22 into a conduit 44*a*. The conduit 44*a* travels downward under the earths surface 14 to the underground geologic formation 28, which as mentioned above is capable of holding and storing the compressed gas 20. Another conduit 44*b* travels from the underground geologic formation 28 to the high temperature region 26, passing therethrough and back up this time to a valve 46 on the surface 14, the function of which will be explained later. The compressed gas 20 is heated as it passes in the conduit 44*b* through the high temperature region 26 and then back up to a valve 46 on the surface 14. Yet another conduit 44*c* extends from the underground geologic formation 28 upwards to the valve 46 on the surface 14. Conduit 44*c* connects the valve 46 to an inlet 32 of pressure engine 34 located on the surface 14.

As above, conduit 44*b* though shown in FIG. 3 with a looped section 27, may in fact comprise two separate pipes within the high temperature region 26 and separated by a distance (not shown). What is important however is that the compressed gas is forced under pressure downward to the high temperature region 26 and recovered by forcing it back upwards in this case to the valve 46.

It will now be understood that valve 46 may be used to regulate the amount of heated compressed gas 30 that enters the inlet 32 of pressure engine 34, as compared to the amount of unheated compressed gas 20. As shown, valve 46 can be configured to mix the compressed gas 20 from the geologic formation 28 and the heated compressed gas 30 passing through the high temperature region 26. However, as will be appreciated, the gases 20 and 30 can also be mixed in a separate mixing apparatus (not shown) positioned either before or after the valve 46, depending on the application. For example, in the embodiment of FIG. 4, a separate mixing chamber is not necessary since mixing of the gases 20 and 30 occurs in the geologic formation 28.

The regulated compressed gas 48 drives the pressure engine 34 as it passes therethrough to outlet 36 which exhausts the gas to the atmosphere. Preferably, the regulated compressed gas 48 is allowed to expand in an expander 38 associated with the pressure engine 34 prior to entering the pressure engine 34. The pressure engine 34 is operatively connected to and drives generator 40 which generates electricity which is then transmitted to a power grid through powerlines 42 in a known fashion.

It will be appreciated that in the embodiment shown in FIG. 3, the preferred CGESR system 10 will include in the gas compressor 12 and gas expander 38 means for inhibiting the release of the compressed gas 20 from the geologic formation 28 when either the gas compressor 12 or the pressure engine 34 are not operating. Alternately, valves 37 may be added to the system 10 to accomplish the same result, for example in conduit 44*a* after gas compressor 12, and in conduit 44*c* before expander 38. Furthermore, the valve 37 before expander 38 (which is used to regulate the amount of heated compressed gas 30 that enters the inlet 32 of pressure engine 34) may be obviated by configuring valve 46 to permit complete inhibition of heated compressed gas 30 into conduit 44*c*.

Figure 4:
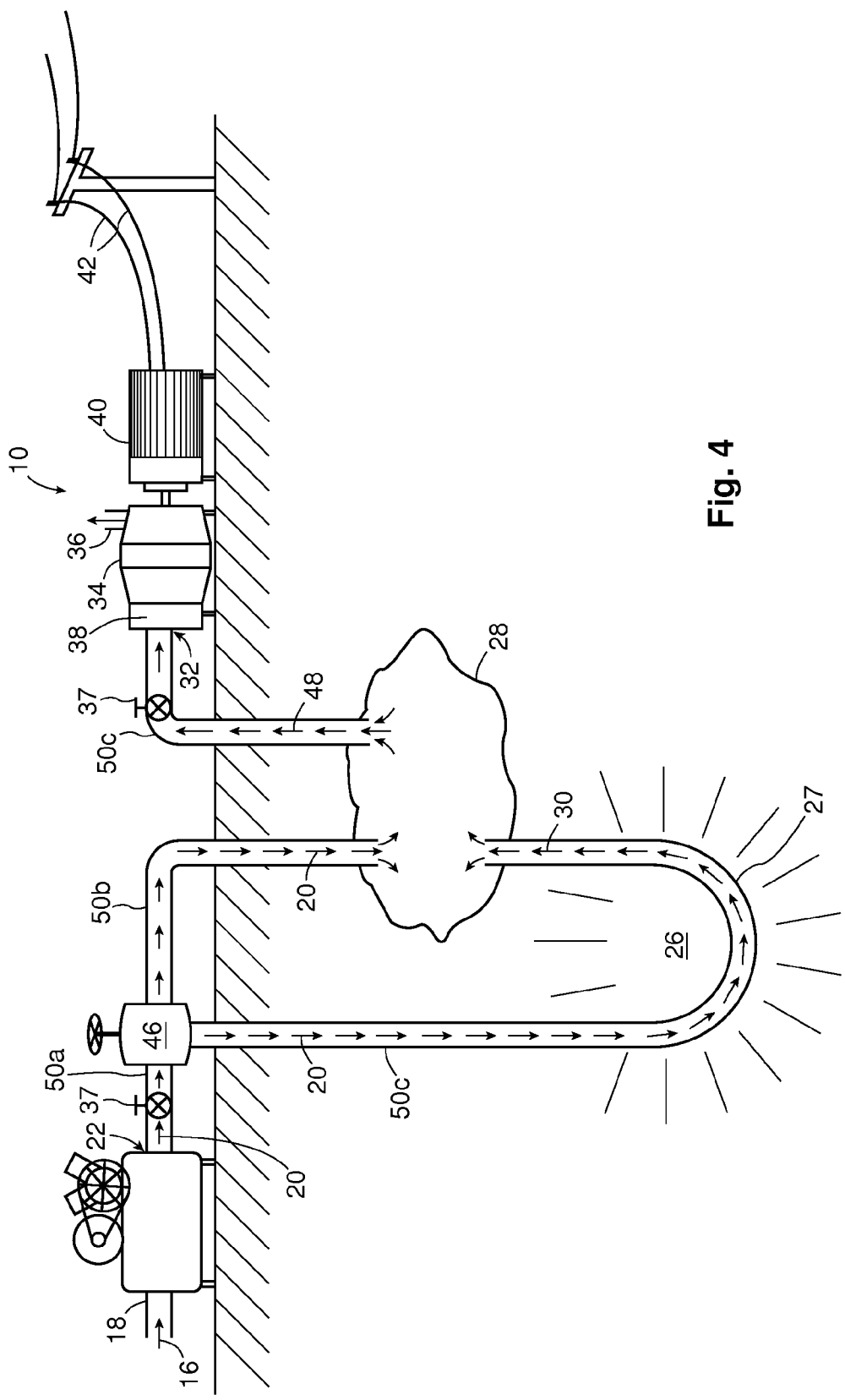
FIG. 4 is a diagram of another embodiment of the CGESR system of the present invention.

FIG. 4 shows a variation of the system 10 shown in FIG. 3 which is described above. As can be seen the gas compressor 12, is positioned on the earths surface 14, a draws a gas 16, preferably air, through an inlet 18, compresses the gas and expels the compressed gas 20 under pressure to valve 46 through conduit 50*a*. One conduit 50*b* connects the valve to the underground geologic formation 28, which as mentioned above is capable of holding and storing the compressed gas. Another conduit 50*c* travels from the valve 46 to the high temperature region 26, passing therethrough and then back up this time to the same underground geologic formation 28. The compressed gas 20 is heated as it passes in the conduit 50*c* through the high temperature region 26 and then back up to the underground geologic formation 28. Yet another conduit 50*c* extends from the underground geologic formation 28 upwards to the an inlet 32 of pressure engine 34 located on the surface 14. The valve 46 may be used to regulate the amount of unheated compressed gas 20 that enters the underground geologic formation 28, as compared to the amount of heated compressed gas 30 enters the underground geologic formation 28. Ultimately, since only one conduit 50*c* connects the underground geologic formation 28 to the pressure engine 34, the valve 46 regulates the amount of regulated compressed gas 48 which drives the pressure engine 34 as it passes therethrough to outlet 36 before being exhausted to the atmosphere. Preferably, the regulated compressed gas 48 is allowed to expand in an expander 38 associated with the pressure engine 34 prior to entering the pressure engine 34. The pressure engine 34 is operatively connected to and drives generator 40 which generates electricity which is then transmitted to a power grid through powerlines 42 in a known fashion.

As above, conduit 50*c* though shown in FIG. 4 with a looped section 27, may in fact comprise two separate pipes within the high temperature region 26 and separated by a distance (not shown). What is important however is that the compressed gas is forced under pressure downward to the high temperature region 26 and recovered by forcing it back upwards in this case to the underground geologic formation 28.

It will be appreciated that in the embodiment shown in FIG. 4, the preferred CGESR system 10 will include in the gas compressor 12 and the gas expander 38 means for inhibiting the release of the compressed mixed gas from the geologic formation 28 when either the gas compressor 12 or the pressure engine 34 are not operating. Alternately, valves 37 may be added to the system 10 to accomplish the same result, for example in conduit 50*a* after gas compressor 12, and in conduit 50*c* before expander 38. Furthermore, the valve 37 after the gas compressor 12 (which is used to regulate the amount of heated compressed gas 30 that enters the inlet 32 of pressure engine 34) may be obviated by configuring valve 46 to permit complete inhibition of heated compressed gas 30 into conduit 44*c*.

These latter two embodiments shown in FIGS. 3 and 4 offer a greater degree of control over the pre-expansion and post expansion gas temperatures, but at the expense of greater capital costs as well as operating and maintenance costs.

Figure 5:
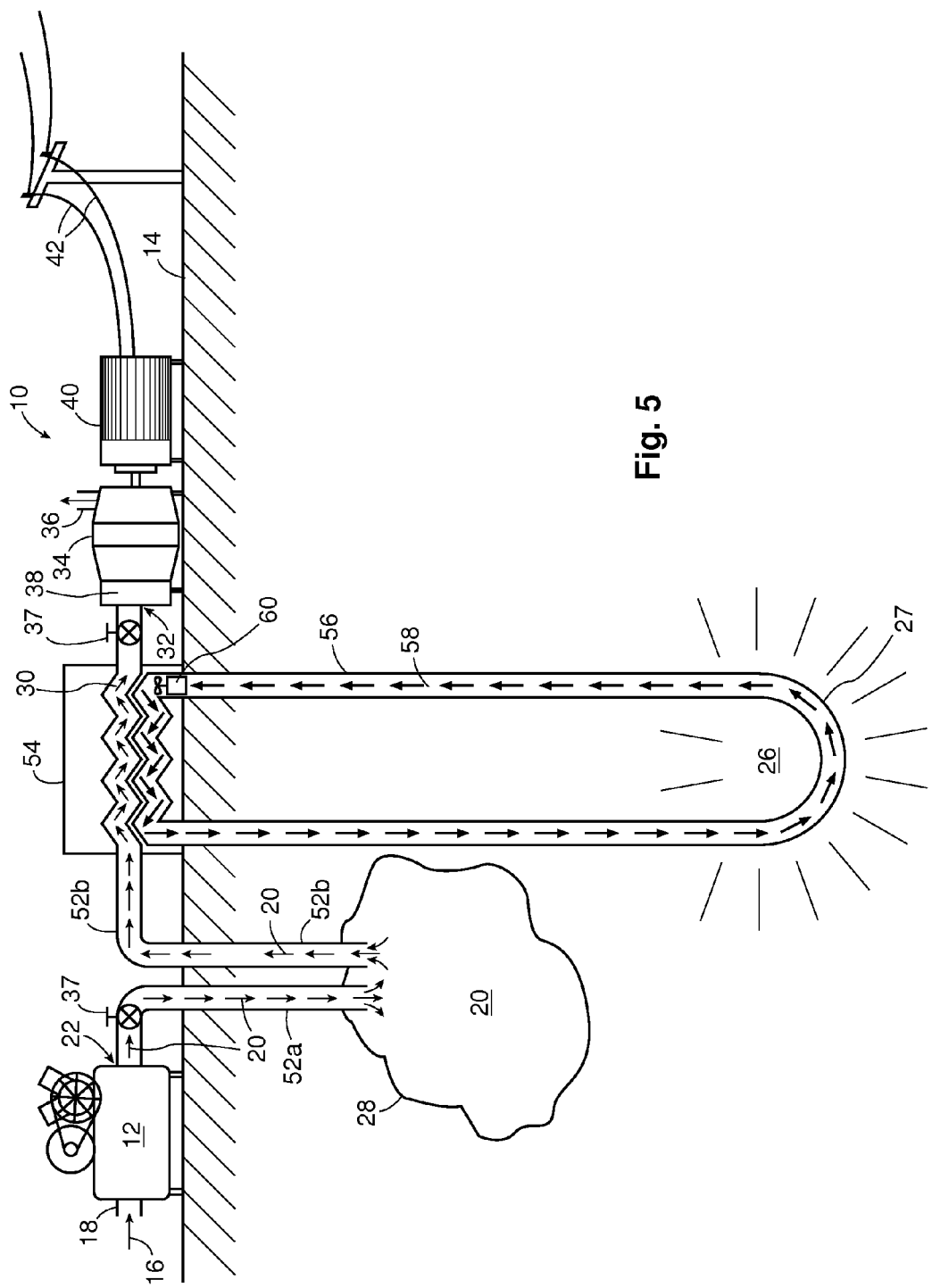
FIG. 5 is a diagram of another embodiment of the CGESR system of the present invention.

FIG. 5 shows another embodiment of the CGESR system 10. As can be seen the gas compressor 12, positioned on the earths surface 14, draws a gas 16, preferably air, through an inlet 18, compresses the gas and expels the compressed gas 20 under pressure to the underground geologic formation 28 via conduit 52*a*. As mentioned above, the underground geologic formation 28 is capable of holding and storing the compressed gas 20. Another conduit 52*b* extends from the underground geologic formation 28 upwards to the surface 14 through heat exchanger 54 and terminates in inlet 32 of pressure engine 34. Heating loop 56 comprises a closed loop conduit filled with a heat conducting medium 58 such as, for example, air, water, carbon dioxide, or any type of thermal conductor in liquid or gas phase known in the art or later discovered. The heating loop 56 travels underground to the high temperature region 26, passing therethrough and then back up to the surface 14. A pump 60 may be used to cycle the heat conducting medium 58 inside the heating loop 56. Inside the heat exchanger 54, conduit 52*b* is heat conductively connected to a portion of the heating loop 56, to provide heat for the compressed gas 20. However, it is also contemplated that the heating loop 56 may be arranged so that a portion thereof heats the pressure engine 34 and/or expander 38 instead of, or in addition to the compressed gas 30.

The heated compressed gas 30 drives the pressure engine 34 as it passes therethrough to outlet 36 before being exhausted to the atmosphere. Preferably, the heated compressed gas 30 is allowed to expand in the expander 38 associated with the pressure engine 34 prior to entering the pressure engine 34. The pressure engine 34 is operatively connected to and drives generator 40 which generates electricity which is then transmitted to a power grid through powerlines 42 in a known fashion.

Heating loop 56 though shown in FIG. 5 with a looped section 27, may in fact comprise two separate pipes within the high temperature region 26 and separated by a distance (not shown). What is important however is that the heat conducting medium 58 is forced downward to the high temperature region 26 and recovered by forcing it back upwards in a loop.

Figure 6:
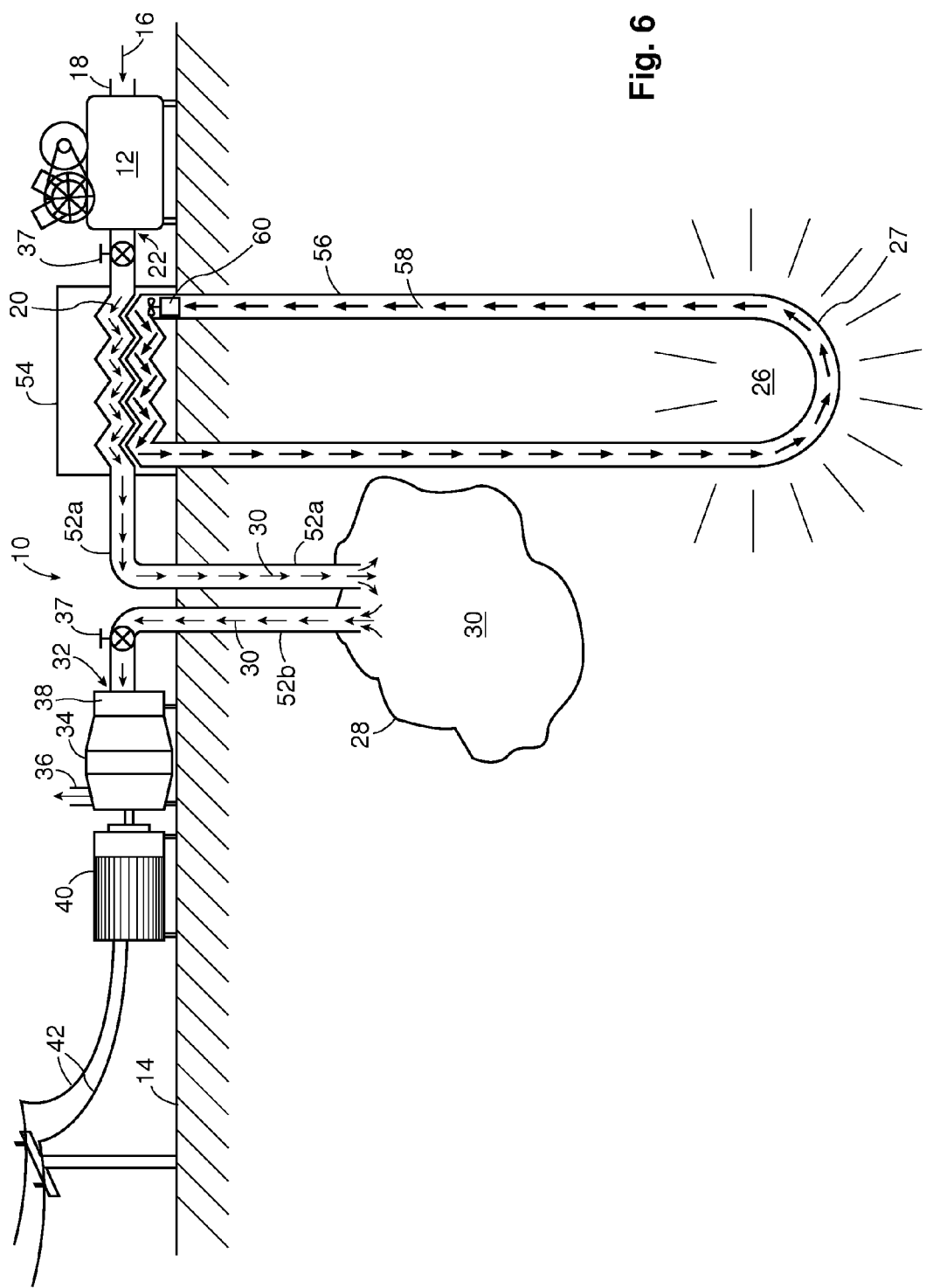
FIG. 6 is a diagram of another embodiment of the CGESR system of the present invention.

FIG. 6 shows a variation of the system 10 shown in FIG. 5 which is described above. According to this embodiment, the position of gas compressor 12 relative to heat exchanger 54 is swapped with the pressure engine 34 and generator 40. Thus the gas compressor 12, positioned on the earths surface 14, draws a gas 16, preferably air, through an inlet 18, compresses the gas and expels the compressed gas 20 under pressure to the underground geologic formation 28 via conduit 52*a*. As mentioned above, the underground geologic formation 28 is capable of holding and storing the compressed gas 20. Heat exchanger 54 is positioned on the surface 14 between the gas compressor 12 and the underground geologic formation 28. Inside the heat exchanger 54, conduit 52*a* is heat conductively connected to a portion of the heating loop 56, to provide heat for the compressed gas 20 before it passes into the underground geologic formation 28.

As described above, heating loop 56 comprises a closed loop conduit filled with a heat conducting medium 58 such as, for example, air, water, carbon dioxide, or any type of thermal storage comprising liquid or gas known in the art or later discovered. The heating loop 56 travels underground to the high temperature region 26, passing therethrough and then back up to the surface 14. A pump 60 may be used to cycle the heat conducting medium 58 inside the heating loop 56.

Another conduit 52b extends from the underground geologic formation 28 upwards to the surface and terminates in inlet 32 of pressure engine 34. The heated compressed gas 30 drives the pressure engine 34 as it passes therethrough to outlet 36 before being exhausted to the atmosphere. Preferably, the heated compressed gas 30 is allowed to expand in the expander 38 associated with the pressure engine 34 prior to entering the pressure engine 34. The pressure engine 34 is operatively connected to and drives generator 40 which generates electricity which is then transmitted to a power grid through powerlines 42 in a known fashion.

As above, heating loop 56 though shown in FIG. 6 with a looped section 27, may in fact comprise two separate pipes within the high temperature region 26 and separated by a distance (not shown). What is important however is that the heat conducting medium 58 is forced downward to the high temperature region 26 and recovered by forcing it back upwards in a loop.

It will be appreciated that in the embodiments shown in FIGS. 5 and 6, the preferred CGESR system 10 will include in the gas compressor 12 and the expander 38 means for inhibiting the release of the compressed heated gas 30 from the geologic formation 28 when either the gas compressor 12 or the pressure engine 34 are not operating. Alternately, valves 37 may be added to the system 10 to accomplish the same result, for example in conduit 52a after gas compressor 12, and in conduit 52b before expander 38.

The diameter of the conduits will typically depend on the depth at which the geothermal formation is located and whether air is used as the gas. If a liquid is used as the heat conducting medium 58 for example in the embodiments shown in FIGS. 4 and 5, and the geothermal formation is deep underground, a small diameter pipe such as 2⅞ inch may be used and a shallower geothermal formation would more likely require a 3½ inch diameter pipe because of the pressures involved with a 10,000 to 20,000 foot column of fluid. If the heat conducting medium 58 is air the pipe diameter may be greater such as for example 7 to 12 inches, and even greater for shallower geothermal formations.

It is contemplated that since the compression cycle typically occurs in a different time period from the expansion cycle, another variation on the above described embodiments of the present invention is to heat the just compressed air just before it is put into the underground geologic formation so that the gas that is later brought up for expansion does not need to be heated at the last moment.

As will be appreciated by persons skilled in the art, the underground geologic formation 28 is an underground cavity which can be used to hold and store compressed gas. One example of an underground geologic formation which may be suitable is an abandoned potash solution mine where water was pumped down into a potash formation and dissolved potash in solution was pumped out. Once all of the economically available potash has been obtained the mine is abandoned and a well contained, stable, cavernous formation is left behind.

The region of high temperature 26 may be any underground region having a temperature sufficiently above ambient temperature at the surface that the expanded gas will be above freezing when it enters the pressure engine 34. Preferably the expanded gas will be warm enough to avoid continual condensation of moisture from the ambient surface air. Preferably, temperature of the region of high temperature 26 will be between 30 and 50° F. or higher above the temperature of ambient air at the surface. However, the temperature may be much greater depending on the economics of the heat transfer process and the gas used if not air. An approximation of the temperature gradient is 1° F. for every 100 feet of depth. Of course this depends on a host of factors including geology, whether it is a geothermal resource zone, etc. A depth of 2,500 to 5,000 feet for example would be a shallow depth that would be sufficient with a good geothermal resource, whereas 10,000 to 20,000 feet might be used under other circumstances including the availability of disused oil or gas wells.

A well known example of a geothermal formation having a region of high temperature closer to the surface is magma having come closer to the earths surface thereby providing heat energy to a large underground region.

As another example, it is not uncommon in the oil and gas industry to encounter brine filled formations deep underground where the temperature is as high as 300° F. In this case the brine may be used as the region of high temperature 26.

Figure 9:
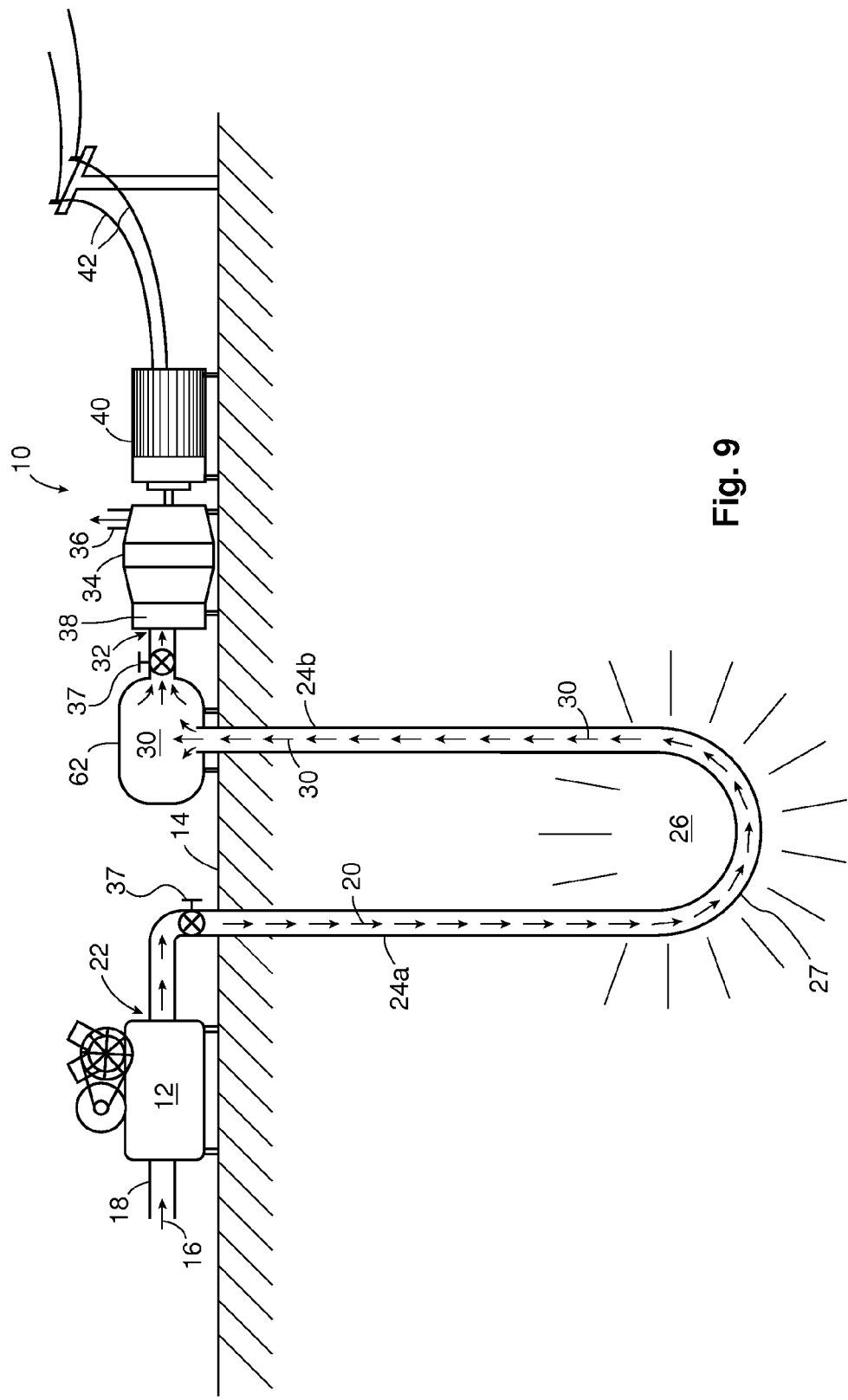
FIG. 9 is a diagram of another embodiment of the CGESR system of the present invention similar to the embodiment in FIG. 1, but which employs storage tanks in place of geologic formations to store the compressed gas.
Figure 10:
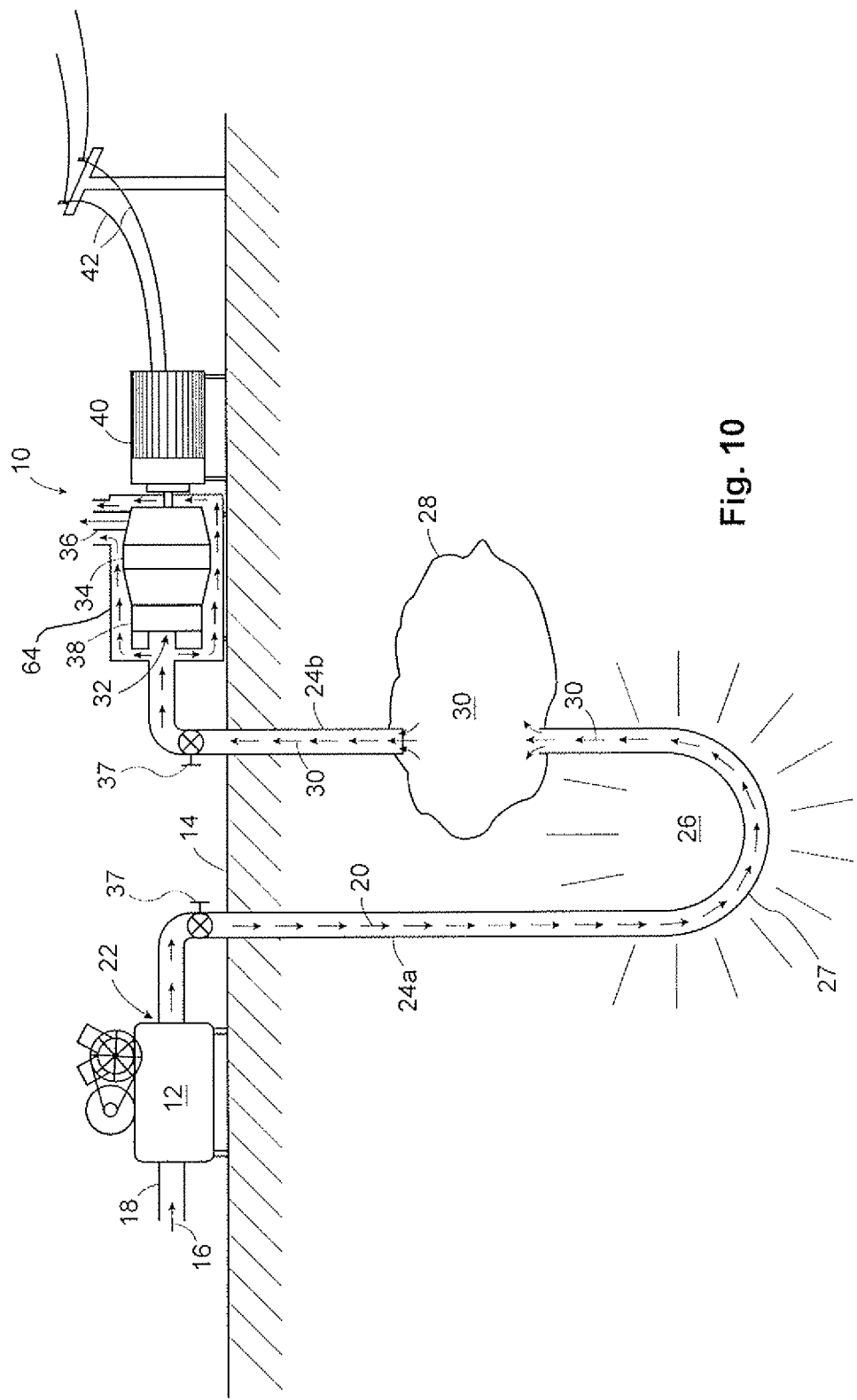
FIG. 10 is a diagram of another embodiment of the CGESR system of the present invention similar to the embodiment in FIG. 1, but which uses the heated compressed gas to also heat the pressure engine.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art. For example, the underground geologic formation 28 may be replaced with one or more above ground compressed gas storage tanks 62 as shown in FIG. 9. As another example, the heated compressed gas 30 may, in addition to driving the pressure engine 34, may be used to heat expander 38 as well as the pressure engine 34 itself, as shown in FIG. 10, with a heated sleeve 64 about the exterior thereof. Those of ordinary skill in the art having access to the teachings herein will recognize these additional variations, implementations, modifications, alterations and embodiments, all of which are within the scope of the present invention, which invention is limited only by the appended claims.

The embodiments of the invention in which an exclusive property or privilege is claimed are defined as follows:

1. A compressed gas energy storage and release (CGESR) system comprising:
    a gas compressor;
    a container for storing compressed gas;
    a pressure engine;
    an electrical power generator operatively connected to said pressure engine;
    a natural geothermal heat source located underground;
    a heating loop;
    a first conduit connecting said gas compressor to said container; and
    a second conduit connecting said container to said pressure engine;
    wherein one portion of said heating loop is positioned in said natural geothermal heat source, and another portion of said heating loop is thermal conductively connected to said second conduit.

2. A compressed gas energy storage and release (CGESR) system comprising:
    a gas compressor;
    a container for storing compressed gas;

a pressure engine;
an electrical power generator operatively connected to said pressure engine;
a natural geothermal heat source located underground;
a heating loop;
a first conduit connecting said gas compressor to said container; and
a second conduit connecting said container to said pressure engine;
wherein one portion of said heating loop is positioned in said natural geothermal heat source, and another portion of said heating loop is thermal conductively connected to said first conduit.

3. A compressed gas energy storage and release (CGESR) system comprising:
a gas compressor for compressing gas;
a container configured to store said compressed gas, said container being in communication with said gas compressor via a first conduit;
a pressure engine in communication with said container via a second conduit, said pressure engine being driven by expansion of said compressed gas, thereby converting said compressed gas into mechanical work;
an electrical power generator operatively connected to said pressure engine, said electrical power generator being configured to convert said mechanical work into electricity;
a natural geothermal heat source positioned at a level below a surface of the earth; and
heating means to heat at least a portion of said compressed gas utilizing heat from said natural geothermal heat source to form a heated compressed gas, wherein said heating means comprises a heat exchanger associated with said first conduit or said second conduit, said heat exchanger thermal conductively connecting a portion of said first conduit or said second conduit to a portion of a heating loop to form said heated compressed gas therein, said heating loop containing a heat conducting medium, at least a portion of said heating loop passing through said natural geothermal heat source to heat said heat conducting medium.

4. The CGESR system as claimed in claim 3, wherein said heating loop comprises a pump for circulating said heat conducting medium therein.

5. The CGESR system as claimed in claim 3, wherein said heat conducting medium is a liquid or a gas.

6. The CGESR system as claimed in claim 3, wherein said heat conducting medium comprises air, water, or carbon dioxide.

7. The CGESR system as claimed in claim 3, wherein said portion of said heating loop passing through said natural geothermal heat source is located within a region below a facility containing either said gas compressor or said pressure engine.

8. The CGESR system as claimed in claim 3, wherein said container is a geologic formation positioned between said surface of the earth and said level of said natural geothermal heat source.

9. The CGESR system as claimed in claim 3, wherein said container comprises one or more storage tanks positioned above ground or underground adjacent said surface of the earth.

10. The CGESR system as claimed in claim 3, wherein said gas is air, carbon dioxide, or helium.

11. The CGESR system as claimed in claim 3, wherein said pressure engine is a turbine or a piston engine.

12. The CGESR system as claimed in claim 3, wherein said pressure engine comprises an expander for expanding said heated compressed gas prior to converting said compressed gas into said mechanical work.

13. The CGESR system as claimed in claim 3, wherein said natural geothermal heat source has a temperature of between 25° F. and 2000° F. above an ambient temperature at said surface of the earth.

14. The CGESR system as claimed in claim 3, further comprising one or more valves positioned in said first conduit and/or said second conduit to facilitate storing said compressed gas in said container.

15. The CGESR system as claimed in claim 3, wherein said natural geothermal heat source is an underground brine filled formation.

16. The CGESR system as claimed in claim 3, wherein said natural geothermal heat source is a region sufficiently deep under the surface of the earth that it has a temperature of between 25° F. and 2000° F. above an ambient temperature at said surface of the earth.

17. A method of storing and releasing compressed gas energy, said method comprising the steps of:
compressing a gas to form a compressed gas;
heating at least a portion of said compressed gas utilizing heat from a natural geothermal heat source to form a heated compressed gas, said natural geothermal heat source being positioned at a level below a surface of the earth;
storing said compressed gas in a container, before or after said heating step;
converting at least said heated compressed gas into mechanical work; and
converting said mechanical work into electricity;
wherein said step of heating at least a portion of said compressed gas comprises directing said compressed gas through a heat exchanger, said heat exchanger being heat conductively connected to a portion of a heating loop containing a heat conducting medium, at least a portion of said heating loop passing through said natural geothermal heat source to heat said heat conducting medium.

18. The method of claim 17, wherein said heating loop comprises a pump for circulating said heat conducting medium therein.

19. The method of claim 17, wherein said heat conducting medium is a liquid or a gas.

20. The method of claim 17, wherein said heat conducting medium comprises air, water, or carbon dioxide.

* * * * *